Sept. 14, 1926.
J. TELLES
1,599,730
PASTEURIZING APPARATUS
Filed May 4, 1925
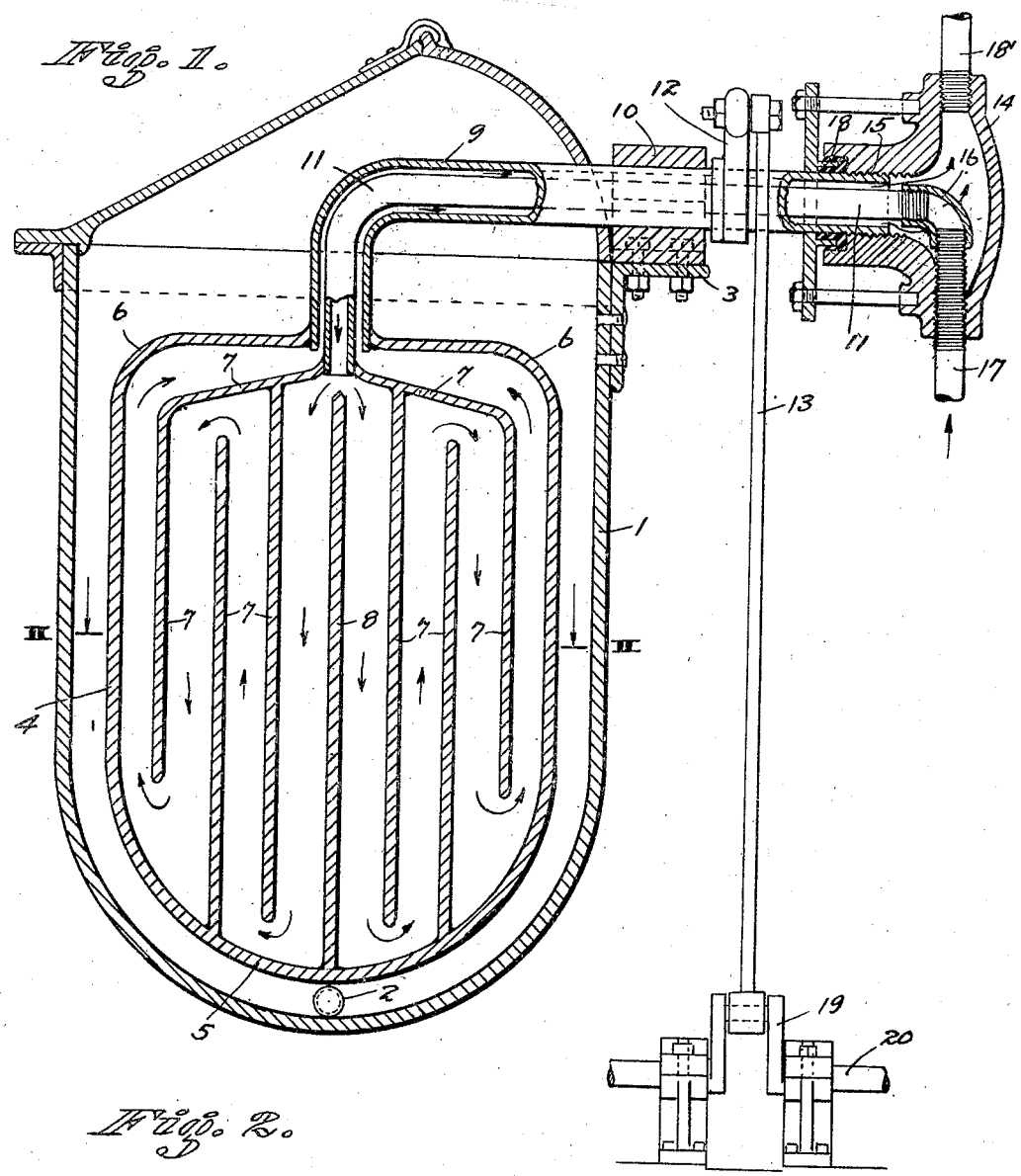
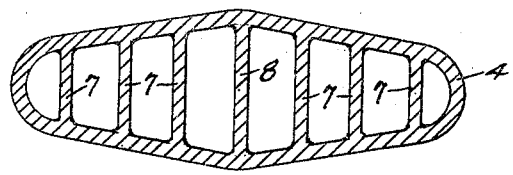
INVENTOR.
JOSEPH TELLES
BY
ATTORNEYS.

Patented Sept. 14, 1926.

1,599,730

UNITED STATES PATENT OFFICE.

JOSEPH TELLES, OF SAN FRANCISCO, CALIFORNIA.

PASTEURIZING APPARATUS.

Application filed May 4, 1925. Serial No. 27,915.

This invention relates to apparatus for Pasteurizing milk or for similar purposes and has for its principal objects the simplification of such apparatus and a more effective and quicker application of heat or cold to the liquid being treated, together with features which make it easier to keep the apparatus in sanitary condition.

In the drawings hereto:

Figure 1 is a vertical section of a conventional milk container with a hollow paddle therein supported for oscillation and arranged for circulation within the paddle of heating or cooling liquids or gases, and Figure 2 is a cross section of the paddle only taken along the line 2—2 of Figure 1.

With reference to the drawings, 1 is a milk container with a rounded bottom having an outlet at 2 and an angle or flange at 3.

Within the container is suspended any number of paddles each of hollow oval section 4 with rounding lower ends 5 and rounded upper corners 6.

The paddle is spaced from the sides and bottom of the container as shown and provided inside with partitions 7, a central partition 8 and suspended on a pipe 9 communicating with its interior with certain relation to the partitions and rotatably supported in the bearing 10 mounted on the angle 3 so that upon oscillating the pipe within the bearing the paddle will be swung back and forth in any milk placed in the container.

Within the pipe 9 is another pipe 11 arranged to open adjacent the central partition 8 so that whatever liquid or gas is sent through it into the paddle will be deflected and follow the direction of the arrows back and forth until it finds outlet in the larger pipe 9.

Any suitable means is provided for operating the paddle permitting a number of them to be hooked up at once, and in the drawing such means is indicated by a crank arm 12 having a connecting rod 13 extending to one crank 19 of a crank shaft 20 so that upon slow revolution of the shaft the paddle will swing gently back and forth in the milk, while the Pasteurizing heat is communicated to the milk by forcing a properly heated fluid through the paddle as described, after which by suitable valve arrangement not shown the hot fluid is exchanged for a cooling one to effect the desired rapid cooling of the milk.

To permit oscillating motion of the pipes the ends pass into a fixed chamber or T 14, the outer pipe 9 being loosely threaded at 15 to the chamber and prevented from leaking by a gland stuffing box 18 of conventional construction, while the smaller pipe 11 extends further into the enlarged interior of the chamber where it is loosely screwed into a smaller elbow 16 having a pipe 17 firmly extending at right angles therefrom and which is also screwed tightly through the side of the T 14.

Thus when the paddle is oscillated as described the threaded ends of pipes 9 and 11 will screw slightly back and forth in the large T but will be effectually prevented from coming off while the stuffing box 15 stops all leakage from the chamber.

Any slight leakage from the inner screw joint of the smaller pipe within the chamber is of no consequence as it simply flows to the outlet 18, tho it is evident to any mechanic that the inner pipe joint could be packed also if desired.

The paddle is preferably made entirely of brass or non-corrosive metal and, owing to its smooth external shape, is easily kept clean and also owing to its rounding corners and freedom from openings, its gentle motion does not churn the milk.

It is obvious that any other method than the one described may be used to operate the paddle but the one shown is found very satisfactory in practice.

I claim:

1. In an apparatus of the character described, a hollow paddle, a pair of pipes extending from the paddle and communicating with the interior thereof, said pipes being arranged one within the other, a bearing supporting the outer pipe for oscillatory motion of the paddle, a crank secured to the outer pipe, means for oscillating the crank, a plurality of vertical partitions depending from the inner said pipe and a plurality of partitions disposed alternately to the first mentioned partitions and rising from the bottom of the said paddle.

2. In a Pasteurizing apparatus, a container, a hollow movable paddle within the container, a pipe communicating with the interior of said paddle, said paddle being adapted to hold a liquid, a second pipe communicating with the interior of said paddle, a plurality of vertical partitions depending from said second pipe, and a plurality of partitions disposed alternately to the first mentioned partitions and rising from the bottom of said paddle.

JOSEPH TELLES.